United States Patent
Backes

(10) Patent No.: US 8,064,847 B2
(45) Date of Patent: Nov. 22, 2011

(54) APPARATUS AND METHOD FOR ISOLATION AND POWER HANDLING IN A RADIO FREQUENCY SWITCH

(75) Inventor: Glen B. Backes, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 435 days.

(21) Appl. No.: 12/426,395

(22) Filed: Apr. 20, 2009

(65) Prior Publication Data

US 2010/0267349 A1  Oct. 21, 2010

(51) Int. Cl.
*H04B 1/44* (2006.01)

(52) U.S. Cl. ............................................ 455/83; 455/78
(58) Field of Classification Search .................... 455/78, 455/83
See application file for complete search history.

(56) References Cited

U.S. PATENT DOCUMENTS

| | | | |
|---|---|---|---|
| 4,952,193 A | 8/1990 | Talwar | |
| 6,229,992 B1 | 5/2001 | McGeehan et al. | |
| 6,510,308 B1 | 1/2003 | Thomas et al. | |
| 6,532,268 B1 * | 3/2003 | Morisawa | 375/257 |
| 6,552,626 B2 | 4/2003 | Sharpe et al. | |
| 6,950,634 B2 | 9/2005 | Dykstra et al. | |
| 6,999,747 B2 | 2/2006 | Su | |
| 7,092,677 B1 | 8/2006 | Zhang et al. | |
| 7,218,909 B2 * | 5/2007 | Rofougaran et al. | 455/333 |
| 7,359,677 B2 | 4/2008 | Huang et al. | |
| 7,456,747 B2 | 11/2008 | Kung | |
| 7,541,890 B2 * | 6/2009 | Cheung et al. | 333/117 |

* cited by examiner

*Primary Examiner* — Long Nguyen
(74) *Attorney, Agent, or Firm* — Fogg & Powers LLC

(57) ABSTRACT

A transmit/receive switching circuit is provided. The transmit/receive switching circuit comprises a first transformer to split a transmission signal into a first split transmission signal and a second split transmission signal. The first split transmission signal is out of phase with the second split transmission signal. The transmit/receive switching circuit also comprises a second transformer to split a received signal into a first split received signal and a second split received signal and to combine the first split transmission signal and the second split transmission signal. The first split received signal is out of phase with the second split received signal. The combined transmission signal is supplied to an antenna port and the received signal is received from the antenna port. The transmit/receive switching circuit also comprises a third transformer to combine the first split received signal and the second split received signal and to supply the combined received signal to a receive port of the transmit/receive switch. Finally, the transmit/receive switching circuit comprises first and second switches. Both the first and second switches are coupled to the first transformer and to the second transformer. The first switch switches between coupling the first split transmission signal to the second transformer and coupling the first split received signal to the third transformer. The second switch switches between coupling the second split transmission signal to the second transformer and coupling the second split received signal to the third transformer.

20 Claims, 3 Drawing Sheets

APPARATUS AND METHOD FOR ISOLATION AND POWER HANDLING IN A RADIO FREQUENCY SWITCH

BACKGROUND

A common method for sharing a single antenna in a communications system is to use a transmit/receive (T/R) switch to alternate between coupling a relatively high power transmitter to the antenna and coupling a receiver to the antenna. In such a system, the high-power signal output by the transmitter typically requires the use of a T/R switch that is specially designed to handle such high-power signals. Designing a T/R switch to handle such high-power signals creates many technical difficulties, including difficulty of design, limited availability of off-the-shelf switches, reduced switch lifetime, and increased thermal heating.

Additionally, T/R switches generally produce port-to-port signal leakage. The leakage from the port coupled to the transmitter to the port coupled to the receiver is particularly unwanted For example, due to the high power output of the transmitter, leakage signals from the transmission signal may exceed the levels of expected receive signals. These high-power leakage signals can cause damage to sensitive receiver components or require design of a less sensitive receiver.

SUMMARY

A transmit/receive switching circuit is provided. The transmit/receive switching circuit comprises a first transformer to split a transmission signal into a first split transmission signal and a second split transmission signal. The first split transmission signal is out of phase with the second split transmission signal. The transmit/receive switching circuit also comprises a second transformer to split a received signal into a first split received signal and a second split received signal and to combine the first split transmission signal and the second split transmission signal. The first split received signal is out of phase with the second split received signal. The combined transmission signal is supplied to an antenna port and the received signal is received from the antenna port. The transmit/receive switching circuit also comprises a third transformer to combine the first split received signal and the second split received signal and to supply the combined received signal to a receive port of the transmit/receive switch. Finally, the transmit/receive switching circuit comprises first and second switches. Both the first and second switches are coupled to the first transformer and to the second transformer. The first switch switches between coupling the first split transmission signal to the second transformer and coupling the first split received signal to the third transformer. The second switch switches between coupling the second split transmission signal to the second transformer and coupling the second split received signal to the third transformer

DRAWINGS

Understanding that the drawings depict only exemplary embodiments of the present invention and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments of the present invention.

DETAILED DESCRIPTION

Figure 1:
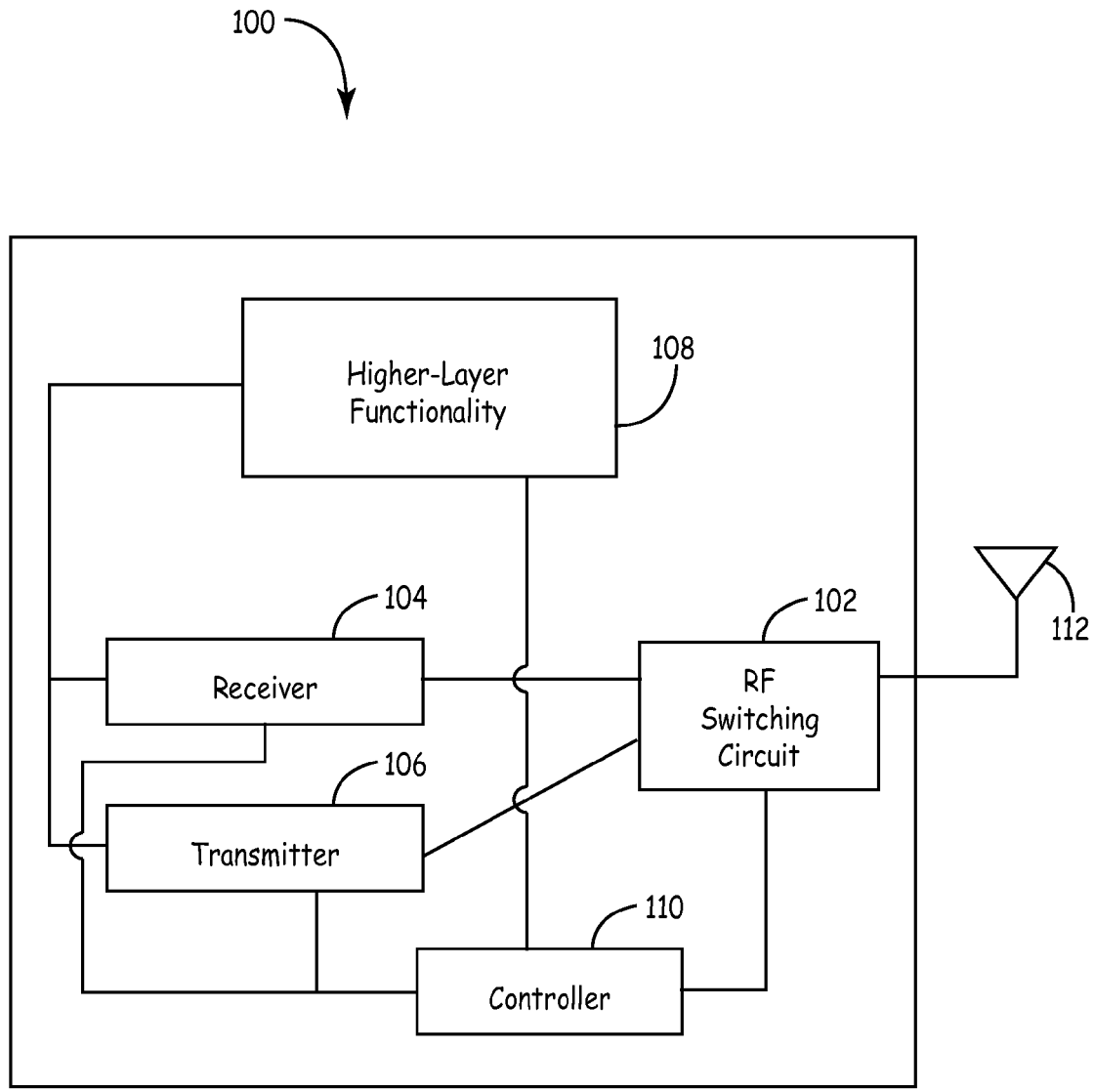
FIG. 1 is a block diagram of one embodiment of an apparatus for switching between a transmit and receive path.

FIG. 1 is a block diagram of one embodiment of an apparatus 100 for switching between a transmitter and receiver. Apparatus 100 comprises a transmit/receive switching circuit 102, a receiver 104, a transmitter 106, higher-layer functionality 108, a controller 110, and an antenna 112. Apparatus 100 is an electronic device that transmits and receives signals via antenna 112. For example, in one implementation of the embodiment shown in FIG. 1, apparatus 100 is a data communication device for transmitting signals to, and receiving signals from another data communication device. In such an implementation, the transmitter 106 imparts information provided by the higher-layer functionality 108 onto one or more radio frequency carriers in order to produce the transmitted signals and the receiver 104 extracts information imparted onto the received signals by the other data communication device and provides the extracted information to the higher-layer functionality 108 for processing thereby. In another implementation of the embodiment shown in FIG. 1, apparatus 100 is a radar device for transmitting electromagnetic signals and receiving reflections from those signals.

Higher-layer function 108 comprises functionality (such as, electronic circuits, processing unit(s), software, and other components) to implement the application-specific functions for which the apparatus 100 was designed. For example, in one implementation of the embodiment shown in FIG. 1 where apparatus 100 is a radar, the higher-layer functionality 108 comprises the circuits, processing unit(s) and software necessary to transmit signals and process received signals to determine range, altitude, speed, and/or direction of objects from which reflected signals are received. Also, in some implementations, the higher-layer functionality 108 also receives input from a user of apparatus 100 and provides output to the user of apparatus 100. Also, at least some of the higher-layer functionality 108 can be implemented using the controller 110.

Receiver 104 comprises electronic circuits to extract information from a radio frequency (RF) signal received by antenna 112. The extracted information is provided to the higher-layer functionality 108 for processing thereby. Transmitter 106 comprises electronic circuits to generate RF signals for radiating from antenna 112 (for example, by imparting onto one or more radio frequency carriers information received from the higher-layer functionality 108). In one embodiment, receiver 104 and transmitter 106 are integrated into a single device such as a transceiver. Controller 110 controls the operation of transmit/receive switching circuit 102, receiver 104, and transmitter 106 based on instructions from higher-layer functionality 108. To transmit signals, controller 110 causes transmitter 106 to generate RF signals and sets transmit/receive switching circuit 102 to couple transmitter 106 to antenna 112 so that the RF signals generated by the transmitter 106 are radiated from antenna 112. To receive signals, controller 110 sets transmit/receive switching circuit 102 to couple receiver 104 to antenna 112 and causes receiver 104 to extract information from the signals received at the antenna 112.

Apparatus 100 operates in a time division duplex (TDD) manner such that signals are transmitted and received at different times. In one embodiment, transmitter 106 generates RF signals for transmission within the same frequency range as the frequency range in which receiver 104 is configured to receive. In an alternative embodiment, transmitter 106 generates RF signals for transmission within a frequency range that differs from the frequency range in which receiver 104 is configured to receive. In yet another embodiment, transmitter 106 and receiver 104 are dynamically adjustable to operate within multiple different frequency ranges.

Figure 2:
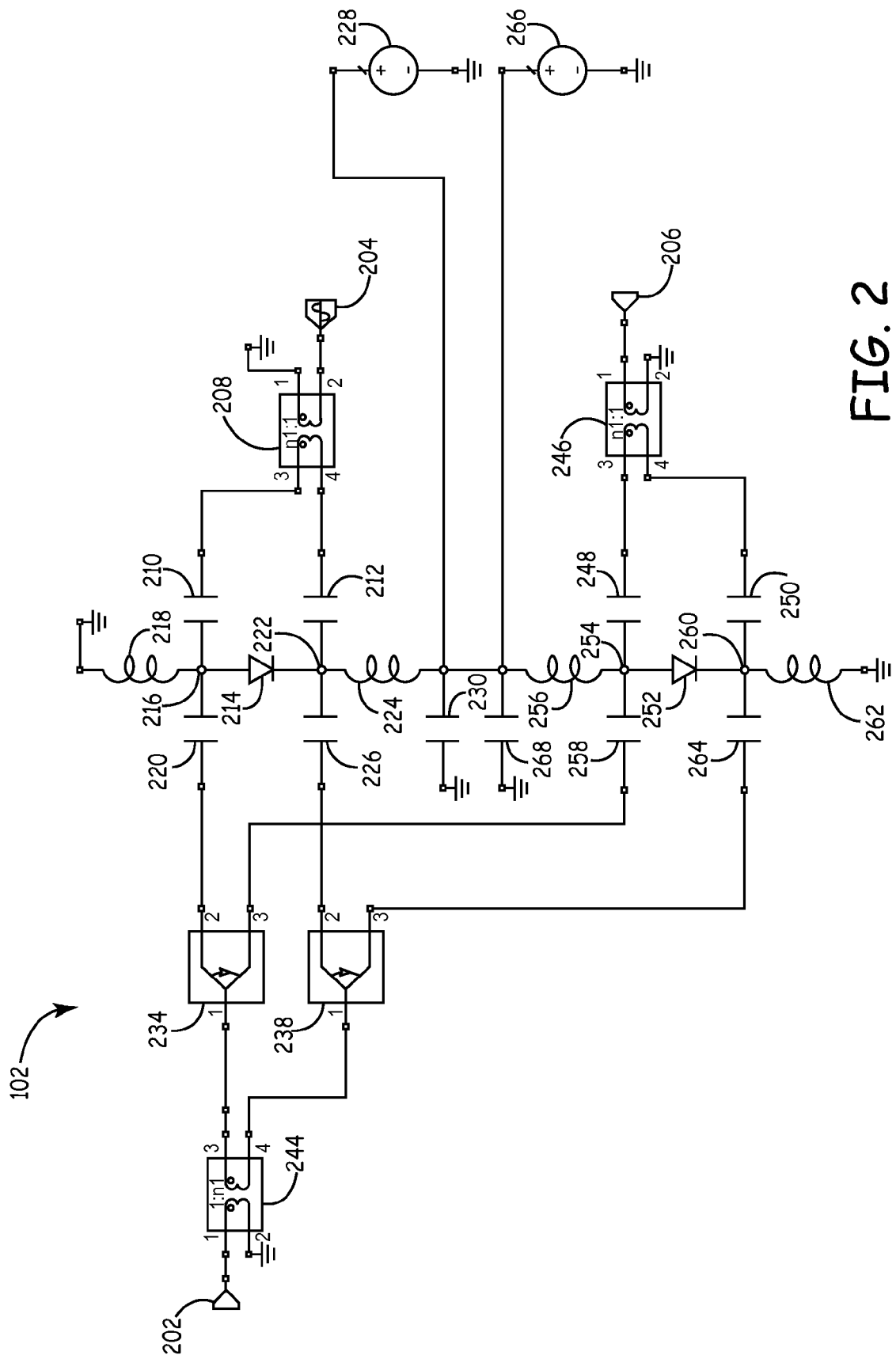
FIG. 2 is a circuit diagram of one embodiment of a circuit for switching between a transmit and receive path.

FIG. 2 is a circuit diagram of one embodiment of transmit/receive switching circuit 102 (also referred to herein as "circuit 102" or "transmit/receive switch 102") for switching between a transmitter and receiver on a single antenna. The embodiment of circuit 102 shown in FIG. 2 is described here as being implemented in the apparatus 100 of FIG. 1, though other embodiments are implemented in other ways. Circuit 102 comprises a common port 202 (also referred to herein as "antenna port 202") coupled to antenna 112 (shown in FIG. 1), a first switched port 204 (also referred to herein as "transmit port 204") coupled to transmitter 106 (shown in FIG. 1), and a second switched port 206 (also referred to herein as "receive port 206") coupled to receiver 104 (shown in FIG. 1). Circuit 102 switches between coupling port 202 to port 204 and coupling port 202 to port 206.

First, the transmission path for signals input into port 204 and output at port 202 is explained. Port 204 of circuit 102 is coupled to a first transformer 208. Transformer 208 has four terminals 208-1, 208-2, 208-3, 208-4. Terminals 208-1, 208-2 are respectively coupled to each end of a primary winding of transformer 208. Terminals 208-3, 208-4 are respectively coupled to each end of a secondary winding. The primary winding is coupled on one end (terminal 208-2) to port 204 and on the other end (terminal 208-1) to ground. Each end (terminal 208-3, 208-4) of the secondary winding is coupled a respective capacitor 210, 212.

Figure 3:
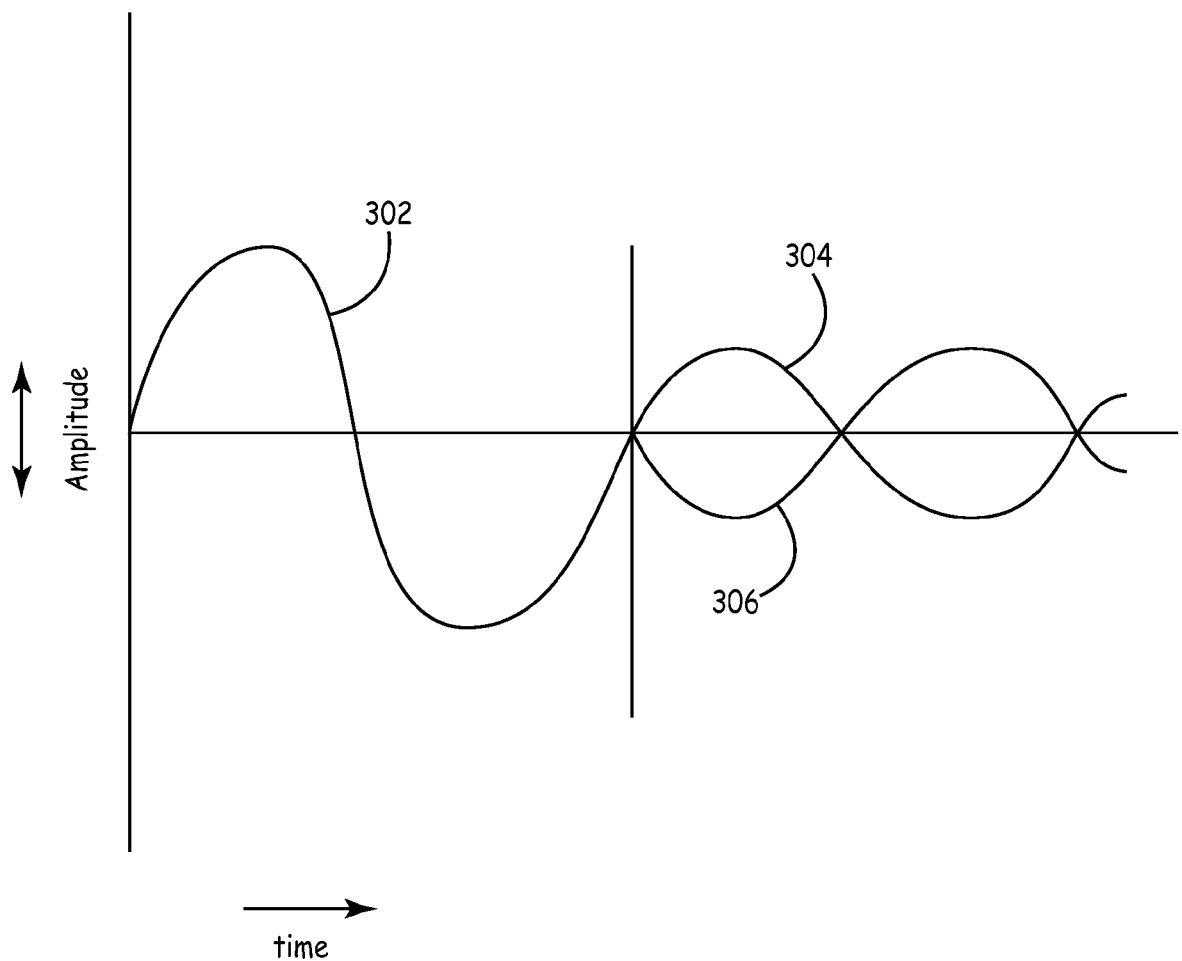
FIG. 3 is a illustrates one example of RF waveforms propagating through the circuit of FIG. 2

RF signals received at port 204 are split into two signals by transformer 208, each of the split signals propagating out of one of terminals 208-3, 208-4. FIG. 3 illustrates one example of an RF transmission signal input into port 204 and the split RF signals output at terminals 208-3, 208-4 of transformer 208. Signal 302 is a 1000 MHz signal having a 46 dBm power level generated by transmitter 106 and input into port 202. Signals 304 and 306 are the split signals output from transformer 208. Each of signals 304, 306 is approximately 43 dBm, which is half of the power of signal 302 input into port 204. Additionally, signals 304 and 306 are 180 degrees out of phase with one another.

The split signal output from terminal 208-3 propagates through capacitor 210 and to node 216. Likewise, the split signal output from terminal 208-4 propagates through capacitor 212 to node 222. Each capacitor 210, 212 is coupled to a respective end of a diode 214. Diode 214 is coupled across transformer 208 from terminal 208-3 to terminal 208-4. Capacitor 210 and diode 214 are coupled at node 216 along with an inductor 218 and another capacitor 220. Capacitor 212 and diode 214 are coupled at node 222 along with an inductor 224 and yet another capacitor 226. Capacitors 210, 212, 220, and 226 act as direct current (DC) blocks (explained in more detail below) and allow their respective split signals to pass through. Accordingly, the split signal propagating through node 216 is input into a first switched port 234-2 of a switch 234 that is coupled to capacitor 220. Likewise the split signal propagating through node 222 is input into a first switched port 238-2 of another switch 238 that is coupled to capacitor 226.

Referring back to nodes 216 and 222, one end of inductor 218 is coupled to node 216 and the other end is coupled to ground. Additionally, one end of inductor 224 is coupled to node 222 and the other end is coupled to a switched DC power supply 228. Also, a capacitor 230 is coupled between power supply 228 and ground. Switched DC power supply 228 is used to control the DC bias of diode 214 (explained in more detail below). Inductors 218 and 224 act as RF chokes that allow the DC voltage from power supply 228 and ground to pass therethrough while blocking the RF signals at nodes 216 and 222 from passing therethrough.

During transmission, switches 234 and 238 are set such that port 234-2 is coupled to common port 234-1 and port 238-2 is coupled to port 238-1. Common port 234-1 of switch 234 and common port 238-1 of switch 238 are coupled to another transformer 244. Transformer 244 has four terminals 244-1, 244-2, 244-3, 244-4. The split signal input into port 234-2 of switch 234 is coupled to terminal 244-3 of transformer 244. Likewise, the split signal input into port 238-2 is coupled to terminal 244-4 of transformer 244. Terminals 244-1, 244-2 are coupled to respective ends of a primary winding of transformer 244, and terminals 244-3, 244-4 are coupled to respective ends of a secondary winding. Terminal 244-1 of transformer 244 is coupled to port 202, which is in turn coupled to antenna 112 (shown in FIG. 1). Terminal 244-2 is coupled to ground.

Transformer 244 recombines (that is, adds constructively) the split signals input at terminals 244-3 and 244-4 and outputs a resulting single RF signal at terminal 244-1. The RF signal output at port 202 corresponds to the signal input at port 204 (minus minimal circuit losses). The recombined RF signal is coupled to and radiated from antenna 112. Transformer 244 has a winding ratio which is matched with the winding ratio of transformer 208, such that the signal output from port 202 is substantially similar to the signal input at port 204. For example, in one embodiment, transformer 208 has a 2 to 1 (primary to secondary) winding ratio and transformer 244 also has a 2 to 1 winding ratio.

In operation, the higher-layer functionality 108 determines (or is otherwise instructed) when to transmit signals from apparatus 100. The higher-layer functionality 108 may determine, for example, when to transmit signals based on a TDD frame pattern of a transmission scheme used by a telecommunications system in which apparatus 100 is operating. For example, apparatus 100 may be used in a TDD transmission scheme having defined periods of upstream and downstream communication which dictate when apparatus 100 is transmitting and receiving signals respectively. In other embodiments, the higher-layer functionality 108 "determines"when to transmit signals based on a command received from an operator of apparatus 100.

When the higher-layer functionality 108 determines it is time to transmit signals, the higher-layer functionality 108 sends a command to controller 110 to set apparatus 100 for transmission. Based on the command from the higher-layer functionality 108, controller 110 sets transmitter 106 to generate RF signals based on information received at transmitter 106 from the higher-layer functionality 108. Controller 110 also sets transmit/receive switching circuit 102 to couple port 204 to port 202, which couples signals output from transmitter 106 to antenna 112. To couple port 204 to port 202, controller 108 sets switch 234 to couple switched port 234-2 to port 234-1. Likewise, controller 108 sets switch 238 to couple port 238-2 to port 238-1.

Also, in order to transmit, controller 108 (in addition to setting switches 234 and 238) sets transmit/receive switching circuit 102 to reverse bias diode 214. Diode 214 is reverse biased with a sufficiently large voltage such that signals at nodes 216 and 222 do not forward bias diode 214. Diode 214 is reverse biased by setting switching power supply 228 to output a high (positive) voltage. This enables each of the split signals to pass through diode 214 and propagate to switches 234 and 238 respectively. In one implementation of such an embodiment where the input transmission signal at port 204 is 46 dBm, switching power supply 228 is set to supply +100 volts to the cathode of diode 216.

As explained above, during transmission of signals in transmit/receive switching circuit 102, RF signals generated by transmitter 106 are received at port 204. The RF signals received at port 204 are split by transformer 208 into two signals that are 180 degrees out of phase with one another. Each of these split signals propagates out of one of nodes 208-3, 208-4 of transformer 208. One of the split signals propagates through capacitors 210 and 220 to port 234-2 of switch 234. The other split signal propagates through capacitors 212 and 226 to port 238-2 of switch 238. Capacitors 210, 212, 220, 226 act as DC blocks to reduce the effect of the DC voltage from switching power supply 228 and the ground on the operation of transformers 208 and 244. Meanwhile, inductors 218 and 224 act as RF chokes reducing the effect of the ground and the DC voltage from switched power supply on the split RF signals.

Next, the receive path of signals input at port 202 and output at port 206 is explained. Receive path signals are output at a second switched port 206 of transmit/receive switching circuit 102 that is coupled to receiver 104 (shown in FIG. 1). During reception, circuit 102 couples signals from port 202 to port 206 for processing by receiver 104. Radiation sensed by antenna 112 (shown in FIG. 1) is output as an RF signal to port 202. The RF signal is split into two signals by transformer 244, each of the split signals propagating out of one of terminals 244-3, 244-4. During reception, switches 234 and 238 are set such that common port 234-1 of switch 234 is coupled to switched port 234-3 and common port 238-1 is coupled to switched port 238-3. Port 234-3 of switch 234 is coupled to capacitor 258 and port 238-3 is coupled to port 264. Thus one of the split signals propagates from terminal 244-3 of transformer 244 through switch 234 and capacitor 258 to node 254. The other split signal propagates from terminal 244-4 through switch 238 and capacitor 264 to node 260. Diode 252 is coupled across a transformer 246 from terminal 246-3 and 246-4 and between node 254 and node 260. Capacitor 248 is coupled between node 254 and terminal 246-3 of another transformer 246. Likewise, capacitor 250 is coupled between node 260 and terminal 246-4 of transformer 246. Capacitors 258, 248, 264, 250 act as DC blocks (explained in more detail below) and allow their respective split signals to pass through. Accordingly, the split signal propagating through node 254 is input into terminal 246-3 of transformer 246. Likewise, the split signal propagating through node 260 is input into terminal 246-4 of transformer 246.

Referring to nodes 254 and 260, one end of an inductor 262 is coupled to node 260 and the other end is coupled to ground. Additionally, one end of an inductor 256 is coupled to node 254 and the other end is coupled to a switched DC power supply 266. Also, a capacitor 268 is coupled between power supply 266 and ground. Switched DC power supply 266 is used to control the DC bias of diode 252 (explained in more detail below). Inductors 256 and 262 act as RF chokes that allow the DC voltage from power supply 266 and ground to pass therethrough while blocking the RF signals at nodes 254 and 260 from passing therethrough.

As mentioned above, one of the split RF signals is provided to transformer 246 at terminal 246-3 and the other split RF signal is provided to the transformed 246 at terminal 246-4.

Terminals 246-1, 246-2 are respectively coupled to each end of a primary winding of transformer 246, and terminals 246-3, 246-4 are respectively coupled to each end of a secondary winding. Terminal 246-1 of transformer is coupled to port 206, which is in turn coupled to receiver 104 (shown in FIG. 1). Terminal 246-2 is coupled to ground.

Transformer 246 recombines (adds constructively) the split signals input at terminals 246-3 and 246-4 and outputs a resulting single RF signal at terminal 246-1. The RF signal output at port 202 corresponds to the signal input at port 202 (minus minimal circuit losses). The recombined RF signal is coupled to and processed by receiver 104. Transformer 246 has a winding ratio that is matched with the winding ratio of transformer 244 such that the signal output from port 206 is substantially similar to the signal input at port 202. For example, in one implementation of such an embodiment, transformer 244 has a 2-to-1 (primary-to-secondary) winding ratio and transformer 246 also has a 2-to-1 winding ratio.

In operation, reception of signals in circuit 102 is similar to that described with respect to the transmission of signals. The higher-layer functionality 108 determines (or is otherwise instructed) when to receive signals at apparatus 100. As mentioned above, the higher-layer functionality 108 may determine, for example, when to receive signals based on a TDD frame pattern of a transmission scheme used by a telecommunications system in which apparatus 100 is operating. In other embodiments, the higher-layer functionality 108 "determines" when to receive signals based on a command received from an operator of apparatus 100.

When the higher-layer functionality 108 determines that it is time to receive signals, the higher-layer functionality 108 sends a command to controller 110 to set apparatus 100 for reception. Based on the command from the higher-layer functionality 108, controller 110 sets receiver 104 to receive signals from port 206 and send information extracted or otherwise determined from the received signals to the higher-layer functionality 108. Controller 108 also sets transmit/receive switching circuit 102 to couple port 202 to port 206, which couples signals sensed by antenna 112 to receiver 104. To couple port 202 to port 206, controller 108 set switch 234 to couple switched port 234-3 to common port 234-1. Likewise, controller 108 sets switch 238 to couple port 238-3 to port 238-1.

In order to receive signals, controller 108 (in addition to setting switches 234 and 238) sets transmit/receive switching circuit 102 to reverse bias diode 252. Diode 252 is reversed biased with a sufficiently high voltage such that signals at nodes 254 and 260 do not forward bias diode 252. Diode 252 is reverse biased by setting switching power supply 266 to output a high (positive) voltage. This enables each of the split signals to pass though diode 252 and propagate to transformer 246. In one implementation of such an embodiment, switching power supply 266 is set to supply −3 volts to the anode of diode 252.

As explained above, during reception of signals in circuit 102, RF signals received at antenna 112 are propagated through port 202 to transformer 244. The RF signals received at port 202 are split by transformer 244 into two signals that are 180 degrees out of phase with one another. Each of these split signals propagates out of a respective one of the nodes 244-3, 244-4 of transformer 244. In order to receive signals, controller 110 sets switches 234, 238 to couple the respective common nodes 234-1, 238-1 to switched port 234-3 and 238-3 respectively. Accordingly, each split RF signal is propagated toward port 206 through the respective switch 234, 238. Capacitors 258, 248, 264, and 250 act as DC blocks to reduce the effect of the DC voltage from switching power supply 266 and ground from affecting the operation of transformers 244 and 246. Meanwhile, inductors 256 and 262 act as RF chokes reducing the effect of ground and the DC voltage from switched power supply on the split RF signals.

The split RF signals that are received at ports 246-3 and 246-4 of transformer 246 are recombined by transformer 246, such that transformer 246 outputs a single RF signals at port 206. The RF signal output at port 206 corresponds to the signal input at port 202 (minus minimal circuit losses). The signal output of port 206 is then processed by receiver 104 and the information obtained therefrom is sent to the higher-layer functionality 108 for further processing thereby.

The embodiment of the transmit/receive switching circuit 102 described here in connection with FIGS. 1 and 2 enables switching between transmission and reception while reducing the power handling needs of the switching device(s). For example, as described above transmitted signals are split by transformer 208 such that two split signals are sent through circuit 102. Each of the split signals comprises approximately half of the power of the original signal, and each of the split signals is switched with a different switch (234, 238). Since each switch 234, 238 switches only one of the split signals, each switch is only required to handle half of the power of the transmitted signal. Accordingly, the power handing capability required for switching is reduced as compared to a conventional switching circuit. Receive path signals are also split to approximately half power by transformer 244. Thus, switches 234 and 238 are also only required to handle half of the receive power.

Additionally, the embodiment of the transmit/receive switching circuit 102 described here in connection with FIGS. 1 and 2 improves the isolation of signals between port 204 and port 206. For example, during transmission, transmission signals input into port 204 are split by transformer 208 into two signals, and the split signals are 180 degrees out of phase with one another. The split signals are propagated through switch 234 and switch 238 respectively. One of the split signals propagates from port 234-2 to port 234-1 of switch 234. Switch 234, however, allows a leakage signal to propagate from port 234-2 to port 234-3. Likewise, the other split signal propagates from port 238-2 to port 238-1 of switch 238. Switch 238, however, allows a leakage signal to propagate from port 238-2 to port 238-3. Since the leakage signal from switch 234 was based on one of the split signals, and since the leakage signal from switch 238 was based on the other split signals, the two leakage signals are 180 degrees out of phase with one another. In one embodiment, switches 234 and 238 are selected such that they are substantially the same so that the two leakage signals are of substantially the same power.

During transmission, in addition to setting switches 234 and 238 and reverse biasing diode 214, controller 108 also sets switching power supply 266 to forward bias diode 252. Since the two leakage signals are 180 degrees out of phase with one another, the two leakage signals propagating in the receive path (from each switch 234, 238 toward node 206) cancel each other out at diode 252. Accordingly, the amount of leakage signal that reaches port 206 is reduced. In one implementation of such an embodiment, diode 252 is forward biased by setting switching power supply 266 to supply +3 volts to the anode of diode 252.

The embodiment of the transmit/receive switching circuit 102 described here in connection with FIGS. 1 and 2 also improves isolation of receive path signals from coupling to port 204 in a similar manner as the signals coupled from the transmit path to the receive path. For example, during reception, signals are split by transformer 244 into two signals that are 180 degrees out of phase with one another. The split signals propagate through switch 234 and switch 238 respectively. One of the split signals propagates from port 234-1 to port 234-3 of switch 234 and the other split signal propagates from port 238-1 to port 238-3 of switch 238. Switch 234, however, allows a leakage signal to propagate from port 234-1 to port 234-2. Likewise, switch 238 allows a leakage signal to propagate from port 238-1 to port 238-2. Since the leakage signal from switch 234 is based on one of the split signals and the leakage signal from switch 238 is based on the other split signal, the two leakage signals are 180 degrees out of phase with one another.

During reception, in addition to setting switches 234 and 238 and reverse biasing diode 252, controller 108 sets switching power supply 228 to forward bias diode 216. Since the two leakage signals are 180 degrees out of phase with one another, the two leakage signals propagating in the transmit path (from each switch 234, 238 toward node 204) cancel each other out at diode 216. Accordingly, the amount of leakage that reached port 204 is reduced. In one implementation of such an embodiment, diode 216 is forward biased by setting switching power supply 228 to supply −3 volts to the cathode of diode 214.

In one implementation of such an embodiment, capacitors 210, 212, 220, 226, 230, 248, 250, 258, 264, and 268 are rated at 1000 pF for transmission and reception signals of 1000 MHz. In this implementation, inductors 218, 224, 256, and 262 are rated at 100 nH. Additionally, in this embodiment, PIN diodes are used. Furthermore, switches 234 and 238 are two substantially similar single pole double throw switches. Finally, in this implementation, transformers 208, 244, and 246 are wire-wound ferrite transformers having a 1 to 1 winding ratio. In one implementation of such an embodiment, in order to reduce losses in circuit 102, transformers 208, 244, and 246 have as low an insertion loss as feasible.

In alternative embodiments, switches 234 and 238 are integrated into a single device comprising a double pole double throw switch. Also, in alternative embodiments, transformers 208 and 246 are transmission line transformers.

Although specific embodiments have been illustrated and described herein, it will be appreciated by those of ordinary skill in the art that any arrangement, which is calculated to achieve the same purpose, may be substituted for the specific embodiment shown. This disclosure is intended to cover any adaptations or variations of the inventions herein. Therefore, it is manifestly intended that the inventions herein be limited only by the claims and the equivalents thereof.

What is claimed is:

1. A transmit/receive switching circuit comprising:
    a first transformer to split a transmission signal into a first split transmission signal and a second split transmission signal, the first split transmission signal being out of phase with the second split transmission signal;
    a second transformer to split a received signal into a first split received signal and a second split received signal and to combine the first split transmission signal and the second split transmission signal, wherein the first split received signal is out of phase with the second split received signal and wherein the combined transmission signal is supplied to an antenna port and the received signal is received from the antenna port;
    a third transformer to combine the first split received signal and the second split received signal and to supply the combined received signal to a receive port of the transmit/receive switch; and
    first and second switches both coupled to the first transformer and to the second transformer, wherein the first switch switches between coupling the first split transmission signal to the second transformer and coupling the first split received signal to the third transformer and wherein the second switch switches between coupling the second split transmission signal to the second transformer and coupling the second split received signal to the third transformer.

2. The transmit/receive switching circuit of claim 1, further comprising a first diode coupled across the third transformer, wherein, while the first and second switches are coupling the first and second split transmission signals, respectively, to the second transformer, the first diode is forward biased such that any leakage signal based on the first split transmission signal and any leakage signal based on the second split transmission signal that propagates to the first diode is canceled.

3. The transmit/receive switching circuit of claim 2, wherein while the first and second switches are coupling the first and second split received signals, respectively, to the third transformer, the first diode is reverse biased such that the first and second split receive signals propagate to the third transformer.

4. The transmit/receive switching circuit of claim 1, further comprising a second diode coupled across the first transformer, wherein, while the first and second switches are coupling the first and second split received signals, respectively, to the third transformer, the second diode is forward biased such that any leakage signal based on the first split received signal and any leakage signal based on the second split received signal that propagate to the second diode cancel one another.

5. The transmit/receive switching circuit of claim 4, wherein while the first and second switches are coupling the first and second split transmission signals, respectively, to the second transformer, the second diode is reverse biased such that the first and second split transmission signals propagate to the second transformer.

6. The apparatus of claim 1, wherein the first transformer, the second transformer, and the third transformer have the same winding ratio.

7. The apparatus of claim 1, wherein the first transformer and the third transformer are configured to split a signal into two signals having approximately half the power of the signal, wherein the two signals are 180 degrees apart in phase.

8. A method comprising:
switching a transmit/receive switching circuit between coupling a transmit port to an antenna port and coupling the antenna port to a receive port;
while the transmit/receive switching circuit is coupling the transmit to the antenna port:
splitting a transmission signal into a first split transmission signal and a second split transmission signal, the first split transmission signal being out of phase with the second split transmission signal; and
combining the first split transmission signal and the second split transmission signal and outputting the combined transmission signal on the antenna port; and
while the transmit/receive switching circuit is coupling the antenna port to the receive port:
splitting a received signal into a first split received signal and a second split received signal, wherein the first split received signal is out of phase with the second split received signal; and
combining the first split received signal and the second split transmission signal and outputting the combined received signal on the receive port.

9. The method of claim 8, further comprising:
while combining the first split transmission signal and the second split transmission signal and outputting the combined transmission signal on the antenna port, canceling any leakage signal based on the first split transmission signal and any leakage signal based on the second split transmission signal.

10. The method of claim 8, wherein splitting a transmission signal splits the transmission signal such that the first split transmission signal and the second split transmission signal are substantially equal in power.

11. The method of claim 10, wherein splitting a transmission signal splits the transmission signal such that the first split transmission signal and the second split transmission signal are 180 degrees apart in phase.

12. The method of claim 9, further comprising:
while combining the first split received signal and the second split received signal and outputting the combined received signal on the receive port, canceling any leakage signal based on the first split received signal and any leakage signal based on the second split received signal.

13. A system for transmitting and receiving signals over the same antenna, the system comprising:
higher-layer functionality;
a transceiver coupled to the higher-layer functionality, the transceiver configured to generate transmission signals based on information received from the higher-layer functionality and configured to process signals for reception and provide information to the higher-layer functionality based on the received signals;
a transmit/receive switching circuit coupled to the transceiver, the transmit/receive switching circuit comprising:
a splitting device configured to split a transmission signal into a first and a second split signals;
a first switch comprising a common port, a first switched port, and a second switched port, the first switched port communicatively coupled to splitting device;
a second switch comprising a common port, a first switched port, and a second switched port, the first switched port communicatively coupled to splitting device;
a splitting and combining device coupled to the common port of the first switch and the common port of the second switch, the splitting and combining device configured to combine the first split signal and the second split signal into an output transmission signal, the splitting and combining device also configured to split a receive signal into a third split signal and a fourth split signal;
a combining device configured to combine a third split signal and a fourth split signal into an output receive signal, the combining device communicatively coupled to the second switched port of the first switch and the second switched port of the second switch;
an antenna coupled to the transmit/receive switching circuit; and
a controller coupled to the transceiver and to the transmit/receive switching circuit, wherein the controller is configured to set the transceiver and the transmit/receive switching circuit to either transmit or receive based on instructions from the higher-layer functionality.

14. The system of claim 13, further comprising:
a first diode coupled across the combining device.

15. The system of claim 14, wherein the controller is configured to:
set the first switched port of the first switch to couple with the common port of the first switch during transmission;
set the first switched port of the second switch to couple with the common port of the first switch during transmission; and
reverse bias the first diode during transmission.

16. The system of claim 14, further comprising:
a second diode coupled across the splitting device.

17. The system of claim 16, wherein the controller is configured to:
set the second switched port of the first switch to couple with the common port of the first switch during reception;
set the second switched port of the second switch to couple with the common port of the first switch during reception;
reverse bias the second diode during reception; and
forward bias the first diode during reception.

18. The system of claim 16, further comprising:
a first DC block coupled between the splitting device and the second diode;
a second DC block coupled between the splitting device and the second diode;
a third DC block coupled between the second diode and the first switched port of the first switch;
a fourth DC block coupled between the second diode and the first switched port of the second switch;
a fifth DC block coupled between the combining device and the first diode;
a sixth DC block coupled between the combining device and the first diode;
a seventh DC block coupled between the first diode and the second switched port of the first switch; and
an eighth DC block coupled between the first diode and the second switched port of the second switch.

19. The system of claim 13, wherein the splitting device is configured to split the transmission signal into two signals having approximately half the power of the transmission signal.

20. The system of claim 13, wherein the splitting device is configured to split the transmission signal into two signals that are 180 degrees apart in phase.

* * * * *